United States Patent
Henna et al.

(10) Patent No.: US 10,611,123 B2
(45) Date of Patent: Apr. 7, 2020

(54) SILICONE CARBONATE POLYMERS AS RELEASE LAYERS FOR PRESSURE SENSITIVE ADHESIVE CONTAINING ARTICLES

(71) Applicant: 3M INNOVATIVE PROPERTIES COMPANY, Saint Paul, MN (US)

(72) Inventors: Phillip H. Henna, Cottage Grove, MN (US); Ramesh C. Kumar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 143 days.

(21) Appl. No.: 15/550,850

(22) PCT Filed: Jan. 28, 2016

(86) PCT No.: PCT/US2016/015265
§ 371 (c)(1),
(2) Date: Aug. 14, 2017

(87) PCT Pub. No.: WO2016/133667
PCT Pub. Date: Aug. 25, 2016

(65) Prior Publication Data
US 2018/0057716 A1   Mar. 1, 2018

Related U.S. Application Data

(60) Provisional application No. 62/118,932, filed on Feb. 20, 2015.

(51) Int. Cl.
*B32B 7/06* (2019.01)
*C09D 183/10* (2006.01)
(Continued)

(52) U.S. Cl.
CPC .............. *B32B 7/06* (2013.01); *B32B 7/12* (2013.01); *B32B 27/08* (2013.01); *B32B 27/281* (2013.01); *B32B 27/283* (2013.01); *B32B 27/36* (2013.01); *C09D 169/00* (2013.01); *C09D 183/10* (2013.01); *C09J 7/201* (2018.01); *C09J 7/22* (2018.01); *C09J 7/255* (2018.01); *C09J 169/00* (2013.01); *C09J 183/10* (2013.01); *C08G 64/186* (2013.01); *C08G 77/448* (2013.01); *C09J 2205/114* (2013.01); *C09J 2453/005* (2013.01); *C09J 2467/006* (2013.01); *C09J 2469/005* (2013.01); *C09J 2483/005* (2013.01); *Y02P 20/582* (2015.11)

(58) Field of Classification Search
CPC ............. B32B 7/06; C09J 7/255; C09J 7/201
See application file for complete search history.

(56) References Cited

U.S. PATENT DOCUMENTS 5,415,935 A   5/1995   Pankratz
5,530,083 A   6/1996   Phelps et al.
(Continued)

FOREIGN PATENT DOCUMENTS

JP   2005-74100   3/2005
JP   2012-072292   4/2012
(Continued)

*Primary Examiner* — Victor S Chang
(74) *Attorney, Agent, or Firm* — Carolyn A. Fischer

(57) ABSTRACT

The disclosure relates to articles comprising a substrate, a pressure sensitive adhesive, and a release layer, wherein the release layer comprises at least one silicone carbonate polymer.

20 Claims, 2 Drawing Sheets

(51) Int. Cl.

| | | |
|---|---|---|
| *C09J 7/25* | (2018.01) | |
| *C09J 7/20* | (2018.01) | |
| *C09J 7/22* | (2018.01) | |
| *C09D 169/00* | (2006.01) | |
| *C09J 169/00* | (2006.01) | |
| *B32B 7/12* | (2006.01) | |
| *B32B 27/08* | (2006.01) | |
| *B32B 27/28* | (2006.01) | |
| *B32B 27/36* | (2006.01) | |
| *C09J 183/10* | (2006.01) | |
| *C08G 77/448* | (2006.01) | |
| *C08G 64/18* | (2006.01) | |

(56) References Cited

U.S. PATENT DOCUMENTS

| | | |
|---|---|---|
| 5,677,376 A | 10/1997 | Groves |
| 5,703,359 A | 12/1997 | Wampler, III |
| 5,756,214 A | 5/1998 | Waldron et al. |
| 5,950,664 A | 9/1999 | Battaglia |
| 6,632,522 B1 | 10/2003 | Hyde et al. |
| 7,358,305 B2 | 4/2008 | Rajagopalan |
| 8,541,151 B2 | 9/2013 | Yu |
| 2003/0215628 A1 | 11/2003 | Ma et al. |
| 2008/0242804 A1 | 10/2008 | Dhara et al. |
| 2010/0076544 A1 | 3/2010 | Hoffmann et al. |
| 2011/0086227 A1 | 4/2011 | Minemura |
| 2011/0207038 A1 | 8/2011 | Yu et al. |
| 2012/0288654 A1 | 11/2012 | Gallucci et al. |
| 2013/0261234 A1 | 10/2013 | Ma |
| 2014/0138025 A1 | 5/2014 | Bartusiak et al. |
| 2014/0179843 A1 | 6/2014 | Van der Mee et al. |

FOREIGN PATENT DOCUMENTS

| | | |
|---|---|---|
| WO | WO 1997/07985 | 3/1997 |
| WO | WO 1998/15601 | 4/1998 |
| WO | WO 1999/03907 | 1/1999 |
| WO | WO 2013/100494 | 7/2013 |

SILICONE CARBONATE POLYMERS AS RELEASE LAYERS FOR PRESSURE SENSITIVE ADHESIVE CONTAINING ARTICLES

CROSS REFERENCE TO RELATED APPLICATIONS

This application is a national stage filing under 35 U.S.C. 371 of PCT/US2016/015265, filed Jan. 28, 2016, which claims the benefit of U.S. Provisional Application No. 62/118,932, filed Feb. 20, 2015, the disclosures of which are incorporated by reference in their entirety herein.

TECHNICAL FIELD

The present disclosure relates to articles having at least one pressure sensitive adhesive and a release layer containing at least one silicone carbonate polymer.

BACKGROUND

Pressure sensitive adhesives are known to be useful as components of articles, such as tapes. In use, many such articles require that the pressure sensitive adhesive be released from contact with another component of the article. Such release can be facilitated by the use of a release layer. In tapes, release layers are sometimes known as low adhesion backsizes.

Some materials that are useful as release layers or low adhesion backsizes are known in the art and are disclosed in, for example, US 2014/0138025 (Bartusiak). Silicone carbonate polymers are not among the known release layers or low adhesion backsizes.

Silicone carbonate polymers and some uses thereof are disclosed in, for example US 2008/02742804 (Dhara) U.S. Pat. No. 5,530,083 (Phelps) US 2012/0288654 (Gallucci), US 2013/0261234 (MA), JP 2005074100 (Masahiko), U.S. Pat. No. 7,358,305 (Rajagopalan), US 2010/0076544 (Hoffmann), U.S. Pat. No. 590,664 (Battaglia), U.S. Pat. No. 5,703,359 (Wampler, III), WO 2013100494 (Kim), US 2011/0201038 (Yu), U.S. Pat. No. 8,541,151 (Yu), and US 2014/0179843 (van der Mee). None of these disclosures envision the use of silicone carbonate polymers as release layers for pressure sensitive adhesive containing articles.

SUMMARY

An article can comprise a substrate having a first major surface and a second major surface, a pressure sensitive adhesive disposed on the first major surface, and a release layer comprising a silicone carbonate polymer disposed on the second major surface. One or both of the first and second major surfaces can optionally comprise a primer layer.

DETAILED DESCRIPTION

Figure 1:
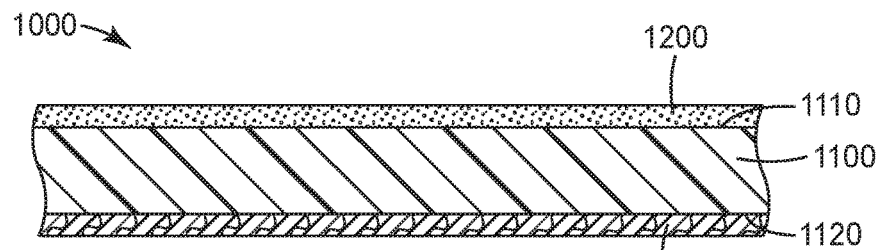
FIG. 1 is a profile view of an article as described herein.

Throughout this disclosure, singular forms such as "a," "an," and "the" are often used for convenience; however, it should be understood that the singular forms are meant to include the plural unless the singular alone is explicitly specified or is clearly indicated by the context.

Some terms used in this application have special meanings, as defined herein. All other terms will be known to the skilled artisan, and are to be afforded the meaning that a person of skill in the art at the time of the invention would have given them.

"Independently," when used in reference to the identity of one or more variable elements, means that each occurrence of any of the variable elements may have the same or different identity, within the specified limitations, regardless of the identity of any other occurrence of the reference element. Thus, if there are two occurrences of element "E," and element E can be independently selected from identity A or identity B, each of the two occurrences of E can be either Y or Z, in any combination (e.g., YY, YZ, ZY, or ZZ).

A "(meth)acrylic polymer" refers to a polymer comprising a polymerized form of at least one of methacrylic acid, a methacrylic acid ester, acrylic acid, an acrylic acid ester, or acrylonitrile. Many (meth)acrylic polymers contain polymerized forms of one or more of methacrylic acid, a methacrylic acid ester, acrylic acid, an acrylic acid ester, or acrylonitrile and do not contain any other polymerized monomers. When the (meth)acrylic polymer contains one or more of a methacrylic acid ester or an acrylic acid ester, the ester can be any ester but is typically an alkyl ester, and most often a $C_1$ to $C_8$ alkyl ester, such as a methyl ester, butyl ester, 2-ethylhexyl ester, or 1-methylheptyl ester.

"Alkyl" refers to an aliphatic hydrocarbon radical. Many alkyl groups are from $C_1$ to $C_{30}$. Some alkyl groups can be $C_1$ or greater, such as $C_2$ or greater, $C_4$ or greater, $C_6$ or greater, or $C_8$ or greater. Some alkyl groups can be $C_{22}$ or smaller, $C_{16}$ or smaller, $C_{12}$ or smaller, $C_8$ or smaller, or $C_4$ or smaller. Unless otherwise indicated, any alkyl group can independently be linear, branched, cyclic, or a combination thereof (e.g., a cyclic alkyl can also have a linear or branched component.) Exemplary alkyl groups include methyl, ethyl, propyl, isopropyl, n-butyl, t-butyl, sec-butyl, iso-butyl, 2-ethyl hexyl, iso-octyl, dodecyl, hexadecyl, behenyl, and the like.

A "hydrocarbon diradical" is a diradical that contains only hydrogen and carbon atoms. Hydrocarbon diradicals can be aliphatic, saturated, or unsaturated; if unsaturated, they can contain one or more aromatic groups.

An "aromatic diradical" is a diradical that contains at least one aromatic group. Many aromatic diradicals contain two aromatic groups. Typical aromatic groups are phenyl groups, particularly phenyl radicals. Aromatic diradicals can also contain other moieties that are not aromatic.

An "aromatic hydrocarbon diradical" is a hydrocarbon diradical that contains at least one aromatic group or aromatic radial. Aromatic hydrocarbon diradicals can also contain other hydrocarbon groups or radicals.

A "cellulosic material" is a material that contains at least 5% cellulose by weight. For the purpose of determining whether a material is a cellulosic material, the cellulose content of synthetic cellulose-containing polymers, such as cellulose acetate, is not considered to be cellulose A "non-cellulosic material" is a material is not a cellulosic material.

"(Meth)acrylate" and its plural refers to one more of acrylic acid, methacrylic acid, acrylic acid esters, methacrylic acid esters, and acrylonitrile.

A "(meth)acrylic polymer" or its plural refers to a polymer or polymers comprising one more of acrylic acid, methacrylic acid, acrylic acid esters, methacrylic acid esters, and acrylonitrile.

A "silicone carbonate polymer" refers to a polymer having at least one silicone portion and at least one carbonate portion. Many silicone carbonate polymers have only one or more silicone portions and one or more carbonate portions. The silicone portion is often a diorganosiloxane. An exemplary diorganosiloxane is polydimethylsiloxane. The carbonate portion is often based on a bisphenol, most commonly bisphenol A.

Pressure sensitive adhesive containing articles, such as tapes, are often packaged such that the pressure sensitive adhesive is in contact with another portion of the article. For example, when the article is a tape, the tape is typically wound such that the pressure sensitive adhesive is in contact with the tape backing. In order to facilitate easy removal of the pressure sensitive adhesive without significant detrimental effect, the substrate can have a release layer disposed thereon.

An article can comprise a substrate having a first major surface and a second major surface. Any suitable substrate can be used. Many substrates are moldable thermoplastics. Most substrates are not foamed and are not porous.

Cellulosic substrates are useful for many applications, and are commonly used for tapes. Common cellulosic substrates include cellulose, paper, regenerated cellulose, wood fibers, and wood flour.

In many cases, the substrate is extrudable. Exemplary extrudable materials include homopolymers, copolymers, and blends of polymers. A variety of additives, such as additives that facilitate extrusion, pigments, dyes, and the like, can be added. Suitable polymers include, but are not limited to, polyolefins such as polypropylene or polyethylene; polystyrene, polycarbonate, polymethyl methacrylate, ethylene vinyl acetate copolymers, acrylate-modified ethylene vinyl acetate polymers, ethylene acrylic acid copolymers, nylon, polyvinylchloride, polyimide, and engineering polymers such as polyketones or polymethylpentanes. Mixtures of such polymers may also be used. In many cases, the substrate does not contain any vinyl-chloride-based polymers.

The substrate can contain a polyolefinic material, which is typically made up of at least 80 wt. % polyolefinic material, including any homopolymers, copolymers, blends, etc. thereof (not including the weight of any additives, if such are present). The substrate often comprises at least 90 wt. %, at least 95 wt. %, or at least 98 wt. %, polyolefinic material. In some cases, the substrate consists essentially of polyolefinic material, noting that this does not preclude the presence of additives such as extrusion aids, plasticizers, antioxidants, colorants, pigments, and the like, which can contain some small level of non-polyolefinic material.

Among other things, the polyolefinic material can be a polyethylenic material, meaning that the polyolefinic material contains at least 80 wt. % of polyethylene polymers (not including the weight of any additives, if present). The polyolefinic material can contain at least 90 wt. %, at least 95 wt. %, or at least 98 wt. % of polyethylene polymers, which are polymers that contain of at least 95 wt. % ethylene units. In many cases, the polyethylene polymers are polyethylene homopolymers. The substrate can consist essentially of polyethylene homopolymers, which does not preclude the presence of additives, such as those discussed above, which may contain some small level of non-polyethylene polymers.

Suitable polyethylene homopolymers include, for example, high-density polyethylene, medium-density polyethylene, low-density polyethylene, linear low-density polyethylene, ultra-low-density polyethylene, and the like. For some applications, polyethylene homopolymers consist essentially of a blend of low density polyethylene (LDPE, i.e. having a density of less than 0.93 g/cc) and high density polyethylene (HDPE, i.e. having a density of at least 0.94 g/cc). For some applications, the LDPE has a density of 0.92 g/cc or less. For some applications, the HDPE has a density of 0.96 or greater.

The LDPE and HDPE can be present at any suitable weight ratio. For example, the LDPE and HDPE may be present at a weight ratio of from about 10:90 LDPE:HDPE to about 90:10 LDPE:HDPE. In some cases, the weight ratio of LDPE to HDPE may be at most about 45:55, at most about 40:60, at most about 35:75, or at most about 30:70. In other cases embodiments, the weight ratio of LDPE to HDPE may be at least about 15:85, at least about 20:80, or at least about 25:75.

For some applications, the substrate comprises polyethylene terephthalate. Such substrates can contain at least 75 wt. %, 80 wt. %, 85 wt. %, 90 wt. %, or 95 wt. % of polyethylene terephthalate based on the total weight of the substrate (not including any primer layers which may be present).

For some applications, the substrate comprises polyimide. Such substrates can contain at least 75 wt. %, 80 wt. %, 85 wt. %, 90 wt. %, or 95 wt. % of polyimide based on the total weight of the substrate (not including any primer layers which may be present).

Suitable substrates can include one or more inorganic fillers, such as one or more of calcium carbonate, kaolin, talc, silica, titanium dioxide, glass fibers, glass bubbles, and the like. Such fillers can be present in any suitable amounts, typically from 0.05 wt. % to 20 wt. % based on the total weight of the substrate.

Depending on the application, one or more other additives, such as antioxidants, extrusion aids, plasticizers, pigments, and dyes, can also be included. Useful additives are known to the person of ordinary skill in the art, and disclosed in, for example, US 2014/0138025 (Bartusiak) and U.S. Pat. No. 6,632,522 (Hyde).

The first major surface of the substrate, upon which the pressure sensitive adhesive is disposed, can optionally include a first primer layer. The first primer layer, when present, enhances bonding of the pressure sensitive adhesive to the first major surface of the substrate. Suitable first primer layers include chlorinated polyolefins, polyamides, modified acrylic polymers, and modified polymers, such as those disclosed in U.S. Pat. No. 5,677,376 (Groves), WO 199815601 (Groves), and WO 1999003907 (Groves). The first primer layer can also be a plasma primer layer, whereby a plasma, such as oxygen or nitrogen, is applied to the surface in order to change the surface chemistry by either oxidizing or reducing the surface.

The second major surface of the substrate, upon which the release layer is disposed, can optionally include a second primer layer. The second primer layer, when present, enhances bonding of the release layer to the second major surface. Suitable second primer layers include chlorinated polyolefins, polyamides, modified acrylic polymers, and modified polymers, such as those disclosed in U.S. Pat. No. 5,677,376 (Groves), WO 199815601 (Groves), and WO 1999003907 (Groves). The second primer layer can also be a plasma primer layer, whereby a plasma, such as oxygen or nitrogen, is applied to the surface in order to change the surface chemistry by either oxidizing or reducing the surface.

When used, the first primer layer, second primer layer, or both, can be affixed to the substrate material by any suitable method. Solvent coating is common. Typically, the content of the first or second primer layer is dispersed into a solvent at an appropriate concentration, which is often no greater than 5% solids. The solvent is then coated onto the substrate material followed by drying at ambient temperature or elevated temperature to produce a thin film of first primer layer, second primer layer, or both. Any solvent suitable for solvent coating can be used. Example solvents can include one or more of water, heptane, hexanes, toluene, acetone, ethyl acetate, isopropanol, and the like. Mixtures of more than one solvent can also be used. Another suitable method is exposure to plasma to form a plasma primer layer as discussed herein.

When the first primer layer, second primer layer, or both, is a plasma primer layer, the plasma primer layer can be created by treating the substrate with plasma, as discussed herein.

One or more pressure sensitive adhesives are disposed on the first major surface of the substrate. Any suitable pressure sensitive adhesive can be used. Pressure sensitive adhesives are normally tacky at room temperature and can be adhered to a surface by application of light finger pressure. Thus, pressure sensitive adhesives can be distinguished from other types of adhesives that are not pressure sensitive. A general description of pressure sensitive adhesives can be found in the Encyclopedia of Polymer Science and Engineering, Vol. 13, Wiley-Interscience Publishers (New York, 1988). Additional description of pressure sensitive adhesives can be found in the Encyclopedia of Polymer Science and Technology, Vol. 1, Interscience Publishers (New York, 1964). Any suitable composition, material or ingredient can be used in the one or more pressure sensitive adhesives. Some suitable pressure sensitive adhesive compositions are disclosed in US 2003/0215628 (Ma). Typically, pressure sensitive adhesives include one or more elastomeric polymers, optionally in combination with one or more tackifying resins.

Elastomeric polymers that are useful in the one or more pressure sensitive adhesives include one or more (meth) acrylic polymers, natural or synthetic rubbers, block copolymers (typically of (meth)acrylates), silicones, and the like. Suitable materials include, without limitation, polyvinyl ethers, polyisoprenes, butyl rubbers, polyisobutylenes, polychloroprenes, butadiene-acrylonitrile polymers, styrene-isoprene, styrene-butylene, and styrene-isoprene-styrene block copolymers, ethylene-propylene-diene polymers, styrene-butadiene polymers, styrene polymers, poly-alpha-olefins, amorphous polyolefins, polysiloxanes, ethylene vinyl acetates, polyurethanes, silicone-urea polymers, silicone-urethane polymers, polyvinylpyrrolidones, and any combination thereof. Examples of suitable (meth)acrylic polymers include polymers made from the polymerization of one or more (meth)acrylates. Commonly used (meth)acrylates include methyl methacrylate, ethyl methacrylate, n-butyl methacrylate, methyl acrylate, ethyl acrylate, n-butyl acrylate, iso-octyl acrylate, iso-nonyl acrylate, 2-ethyl-hexyl acrylate, decyl acrylate, dodecyl acrylate, n-butyl acrylate, hexyl acrylate, octadecyl acrylate, octadecyl methacrylate, acrylic acid, methacrylic acid, acrylonitrile, and combinations thereof. Examples of suitable commercially available block copolymers include those available under the trade designation KRATON from Kraton Polymers, Houston, Tex. Any of these or other suitable materials may be used in any combination, depending on the performance requirements of the final material.

One or more tackifiers can be used as components of the one or more pressure sensitive adhesives. Suitable tackifiers include wood rosins, hydrogenated rosins, tall oil rosins, terpene resins, phenolic resins, polyaromatics, petroleum-based resins, such as aliphatic C5 olefin-derived resins, and the like. Those of ordinary skill in the art recognize that a variety of tackifiers are available, and the specific choice of whether to use one or more tackifiers, and which one or more tackifiers to use, will depend on the performance requirements of the final product. The one or more tackifiers are not required and are not used in all cases. For example, some pressure sensitive adhesives, such as those which include elastomers that are self-tacky, are often used without added tackifier.

The one or more pressure sensitive adhesives can also contain additives such as plasticizers, fillers, antioxidants, stabilizers, pigments, and the like. Such additives are well known the person of ordinary skill in the art, and are disclosed, for example, in U.S. Pat. No. 6,632,522 (Hyde).

A variety of suitable substrates with suitable pressure sensitive adhesives disposed on a first major surface thereof are available commercially. Examples are available under the trade designations SCOTCH HIGH PERFORMANCE BOX SEALING TAPE 373 and 3M 850 CLEAR POLYESTER FILM TAPE, both available from 3M Company, St. Paul, Minn., USA.

The substrate has a second major surface that is distinct from the first major surface. A release layer comprising at least one silicone carbonate polymer is disposed on the second major surface. Any suitable silicone carbonate polymer or polymers can be used. Typical silicone carbonate polymers have at least one silicone portion having the structure of Formula (I).

wherein each R is independently an organic moiety and n is the degree of polymerization of the silicone portion, which is no less than 1. At least one R is typically alkyl. In many cases, each R is alkyl. The alkyl can be, for example, $C_1$ to $C_{22}$ alkyl, $C_1$ to $C_{16}$ alkyl, $C_1$ to $C_{28}$ alkyl, or, most commonly, $C_1$ to $C_{24}$ alkyl. Methyl is most common. In many cases, each R is methyl, in which case the at least one silicone portion is polydimethylsiloxane. In most cases, every silicone portion in the silicone carbonate polymer is polydimethylsiloxane, although this is not required unless otherwise specified.

The degree of polymerization, n, can be any suitable degree of polymerization. In some case, n is no less than 1, 5, 10, 20, 25, 30, 40, 50, 60, 70, 75, 80, 90, 100, 125, 150, 175, 200, 250, 300, 400, 500, 600, 700, 750, 800, 900, 1,000, 1,250, 1,500, 1,750, 2,000, 2,250, 2,500, 2,750, 3,000, or 3,250. The degree of polymerization n can, in some cases, be no greater than 3,500, 3,250, 3,000, 2,750, 2,500, 2,250, 2,000, 1,750, 1,500, 1,250, 1,000, 900, 8,00, 750, 600, 500, 400, 300, 250, 200, 175, 150, 125, 100, 90, 80, 75, 70, 60, 50, 40, 30, 25, or 20.

The silicone carbonate copolymer also contains at least one carbonate portion. Typical carbonate portions have the structure of Formula (II).

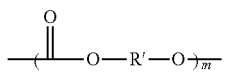

(II)

In Formula (II), R' is independently a hydrocarbon diradical or an aromatic diradical. When a hydrocarbon diradical is used, it can be any hydrocarbon diradical but is often an aromatic diradical. The aromatic diradical can be any aromatic diradical, such as $C_1$ to $C_{50}$ aromatic diradical or $C_1$ to $C_{30}$ aromatic diradical. In some cases, the aromatic diradical can comprise one or more phenyl groups, phenyl radicals, or phenylene diradicals.

In Formula (II), m is the degree of polymerization of the carbonate portion. The value of m can represent any suitable degree of polymerization. In some cases, m is no less than 1, 5, 10, 20, 25, 30, 40, 50, 60, 70, 75, 80, 90, 100, 125, 150, 175, 200, 225, 250, 275, 300, 325, 350, 375, 400, 425, 450, 475, 500, 550, 600, 700, 750, 1,000, 1,000, 1,250, 1,400, 1,500, 1,750, 1,900, or 2,000. In some cases, m is no greater than 2,500, 2,250, 2,000, 1,750 1,500, 1,250, 1,000, 750, 700, 600, 550, 500, 475, 425, 400, 375, 350, 325, 300, 275, 250, 225, 200, 175, 150, 125, 100, 90, 80, 75, 70, 60, 50, 40, 30, 25, 20, or 10.

Many carbonate portions are based on bisphenols. When such carbonate portions are used, each R' is typically independently selected from one or more diradicals of Formulas (III), (IV), (V), (VI), or (VI).

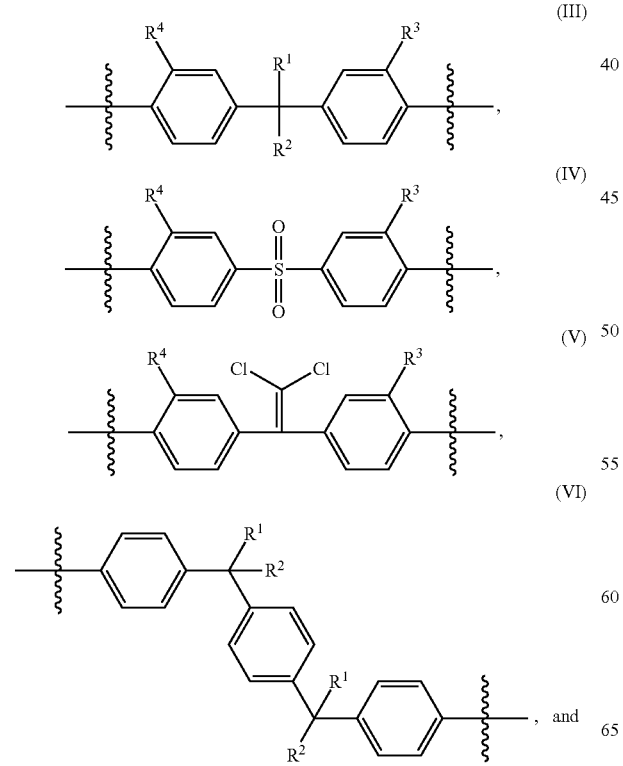

In diradicals of Formulas (III) to (VI), either:

$R^1$ is H, $C_1$ to $C_4$ alkyl, $C_1$ to $C_4$ fluoroalkyl, $C_1$ to $C_4$ perfluoroalkyl, or phenyl, and $R^2$ is H, $C_1$ to $C_4$ alkyl, $C_1$ to $C_4$ fluoroalkyl, $C_1$ to $C_4$ perfluoroalkyl, or phenyl; or $R^1$ and $R^2$ are covalently bonded to one another to make, together with the carbon atom to which they are attached, cyclohexyl, methyl cyclohexyl, dimethyl cyclohexyl, trimethyl cyclohexyl, or tetramethyl cyclohexyl;

$R^3$ is $C_1$ to $C_4$ alkyl, phenyl, or H; and $R^4$ is $C_1$ to $C_4$ alkyl, phenyl, or H.

When such bisphenol-based carbonate portions are used, R' is most commonly a diradical of one or more of Formulas (VII) to (XXII)

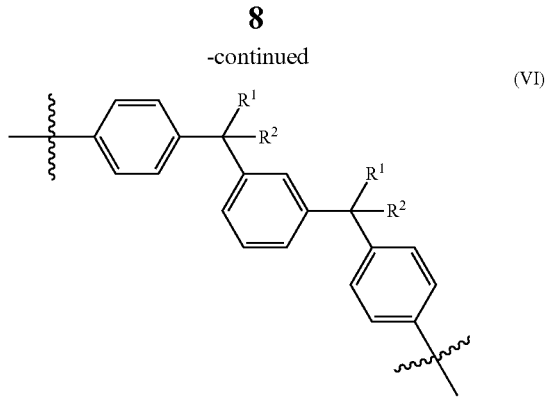

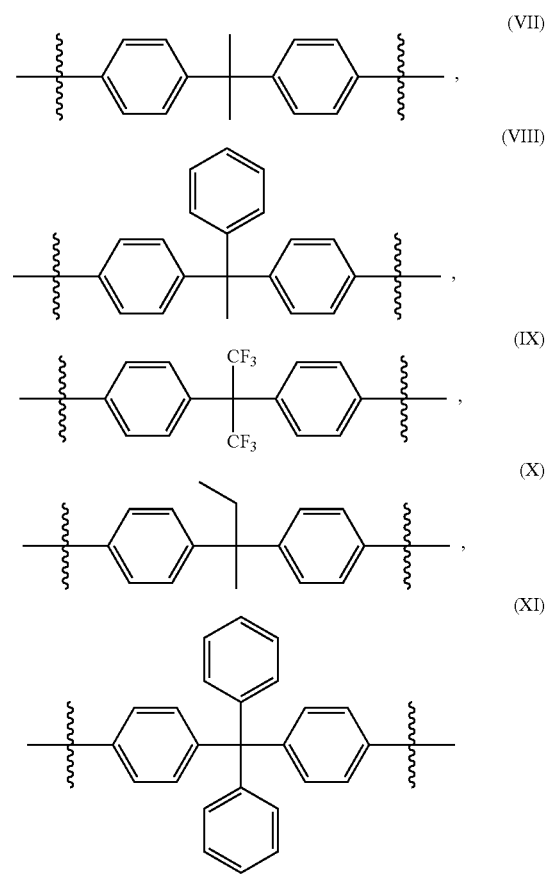

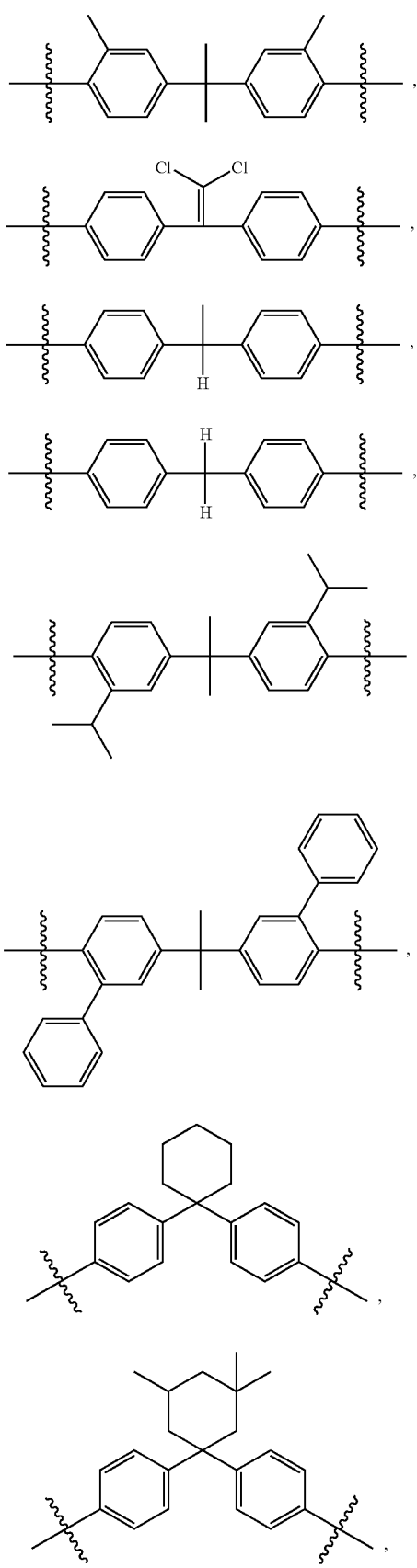

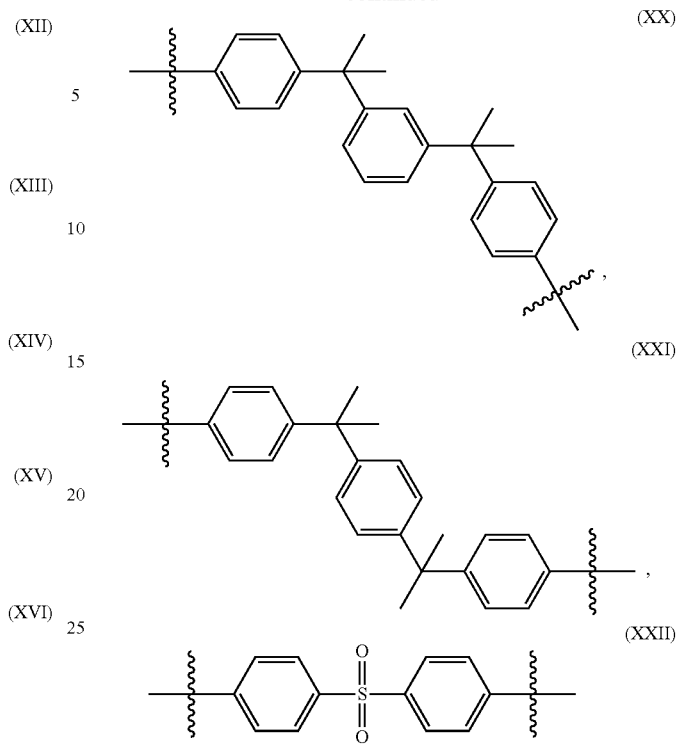

In many cases, the at least one carbonate portion is based on bisphenol A, in which case R' is a diradical of Formula (VII).

Useful silicone carbonate polymers can have any suitable molecular weight. Typically, the number average molecular weight of the silicone carbonate copolymer (measured in Daltons) is no less than 10,000, 12,500, 15,000, 16,000, 17,500, 18,000, 19,000, 20,000, 25,000, 30,000, 40,000, 50,000, 60,000, 70,000, 75,000, 80,000, 90,000, 100,000, 110,000, 120,000, 125,000, 130,000, 140,000, 150,000, 160,000, 170,000, 175,000, or 200,000. The number average molecular weight of the silicone carbonate (measured in Daltons) can be no greater than 250,000, 200,000, 175,000, 170,000, 160,000, 150,000, 140,000, 130,000, 125,000, 120,000, 110,000, 100,000, 90,000, 80,000, 75,000, 70,000, 60,000, 50,000, 40,000, 30,000, 25,000, 20,000, 19,000, 18,000, 17,500, 16,000, 15,000, or 12,500. The number average molecular weight is commonly from 30,000 to 150,000 Daltons.

Silicone carbonate polymers can have any suitable silicone content. Typically, the silicone content of the silicone carbonate polymers is no less than 0.5%, 1%, 2.5%, 5%, 7.5%, 10%, 12.5%, 15%, 17.5%, 20%, 22.5%, 25%, 27.5%, 30%, 32.5%, 35%, 37.5%, 40%, 42.5%, 45%, 47.5%, 50%, 52.5%, 55%, 57.5%, or 60% by weight, based on the total weight of the silicone carbonate polymer. Often, the silicone content of the silicone carbonate polymers is no greater than 65%, 62.5%, 60%, 57.75%, 55%, 52.5%, 50%, 52.5%, 50%, 47.5%, 45%, 42.5%, 40%, 37.5%, 35%, 32.5%, 30%, 27.5%, 25%, 22.5%, 20%, 17.5%, 15%, 12.5%, 10%, 7.5%, 5%, 2.5%, or 1% by weight, based on the total weight of the silicone carbonate polymer.

A variety of suitable silicone carbonate polymers are commercially available. Examples of commercially available silicone carbonate polymers include those sold under the trade designations SSP-080 (Gelest, Inc., Morrisville, Pa., USA), and LEXAN EXL 1414T (SABIC, Riyadh, Saudi Arabia).

The release layer can be made completely of the at least one silicone carbonate polymer. Alternatively, the release layer can also include one or more other materials such as those that are known to be useful as release layers or low adhesion backsizes. Some other materials that can be included are (meth)acrylic polymers, urethane polymers, vinyl ester polymers, vinyl carbamate polymers, fluorine-containing polymers, and silicone-containing polymers.

When one or more additional materials are used in addition to the one or more silicone carbonate polymers in the release layer, the one or more silicone carbonate polymer can be present in any suitable amount. For example the silicone carbonate polymer can be present in greater than 1%, 2.5%, 5%, 7.5%, 10%, 12.5%, 15%, 17.5%, 20%, 22.5%, 25%, 27.5%, 30%, 32.5%, 35%, 37.5%, 40%, 42.5%, 45%, 47.5%, 50%, 52.5%, 55%, 57.5%, 60%, 62.5%, 65%, 67.5%, 70%, 72.5%, 75%, 77.5%, 80%, 82.5%, 85%, 87.5%, 90%, 92.5%, 95%, or 97.5% by weight based on the weight of the release layer. The one or more silicone carbonate polymers can also be present in less than 2.5%, 5%, 7.5%, 10%, 12.5%, 15%, 17.5%, 20%, 22.5%, 25%, 27.5%, 30%, 32.5%, 35%, 37.5%, 40%, 42.5%, 45%, 47.5%, 50%, 52.5%, 55%, 57.5%, 60%, 62.5%, 65%, 67.5%, 70%, 72.5%, 75%, 77.5%, 80%, 82.5%, 85%, 87.5%, 90%, 92.5%, 95%, 97.5%, or 99% by weight based on the weight of the release layer.

The release layer is typically applied by solvent casting, although this is not required unless otherwise specified. In a solvent casting method, the silicone carbonate polymer, along with the other materials that make up the release layer, if any, are dissolved or dispersed in a suitable liquid, which is then applied to the second major surface of the substrate. Suitable liquids include those that are capable of dissolving of dispersing the components of the release layer yet do not unacceptably disrupt the second major surface of the substrate, including any primer layer, upon application to the substrate. Thus, the suitable liquids selected will depend on the nature of the release layer and the substrate, and will typically be selected, when possible, to provide a solution, homogeneous dispersion, or nearly homogeneous dispersion of the materials to be coated without adversely affecting the substrate, including any primer layer that may be a part of the second major surface of the substrate. Examples of suitable liquids include N-methyl pyrrolidone, chlorobenzene, methylene chloride, dimethyl formamide, dimethyl sulfoxide, and the like. Mixtures of one or more of the foregoing, or mixtures of one or more of the foregoing with one or more alcohols, such as methanol, ethanol, or isopropanol, can also be used.

The solution or dispersion can be at any appropriate concentration. Appropriate concentrations, measured in % solids, are often, but not always, greater than 0.5%, 1%, 1.5%, 2%, 2.5%, 3%, 4%, 5%, 6%, 7%, 8%, or 9%. Appropriate concentrations can be, without limitation, less than 10%, 9%, 8%, 7%, 6%, 5%, 4%, 3%, 2.5%, 2%, 1.5%, or 1%.

After the solution or dispersion is applied to the second major surface of the substrate, it is dried. Drying can take place at ambient temperature or at elevated temperatures, depending on, for example, the volatility of the liquid that is used.

Articles as described herein can be in many different forms, but often include a tape. When the article includes a tape, the article can further comprise a roller such that the tape is wound around the roller. In this configuration, the pressure sensitive adhesive is typically in contact with the release layer in order to facilitate easy unwinding of the wound tape.

Depending on the desired application, tapes can be hand-tearable such that they can easily be torn off a roll of tape by hand without the need for scissors, a knife, or another cutting device. Other tapes are not hand-tearable. When such tapes are used, it is often convenient to include a cutting element in the article. The cutting element can facilitate cutting the tape off the roll and into smaller pieces. Rollers and cutting elements for use with tapes are known in the art, and can be selected by a person of ordinary skill depending on the dimensions of the tape, the desired application, and other factors known in the art. A dispenser for the tape can also be included as part of the article. Any type of dispenser can be used, depending on the application. The dispenser can include one or more of a roller, cutting edge, dust cover, and the like.

The Figures depict particular arrangements of articles described herein. FIG. 1 shows article 1000 comprising substrate 1100. Substrate 1100, which can be any substrate, for example those described herein, comprises first major surface 1110 and second major surface 1120.

Pressure sensitive adhesive 1200 is disposed on first major surface 1100. Pressure sensitive adhesive 1200 can be any pressure sensitive adhesive, for example those described herein.

Release layer 1300 is disposed on second major surface 1120. Release layer 1300 can be any release layer, for example those described herein, and can contain any silicone carbonate polymer, such as any of those described herein.

Figure 2:
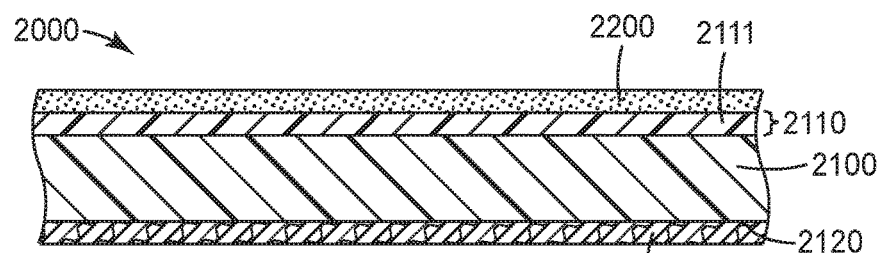
FIG. 2 is a profile view of another article as described herein.

FIG. 2 shows article 2000, which includes substrate 2100, which can be any substrate, for example those described herein, having first major surface 2110 and second major surface 2120. First major surface 2110 includes primer layer 2111, which can be any primer layer, for example those described herein. In FIG. 2, there is no primer layer on second major surface 2120.

Pressure sensitive adhesive 2200 is disposed on first major surface 2110 so as to contact primer layer 2111. Pressure sensitive adhesive 2200 can be any pressure sensitive adhesive, such as those described herein.

Release layer 2300 is disposed on second major surface 2120. Release layer 2300 can be any release layer, such as those described herein, and can contain any silicone carbonate polymer, such as any of those described herein.

Figure 3:
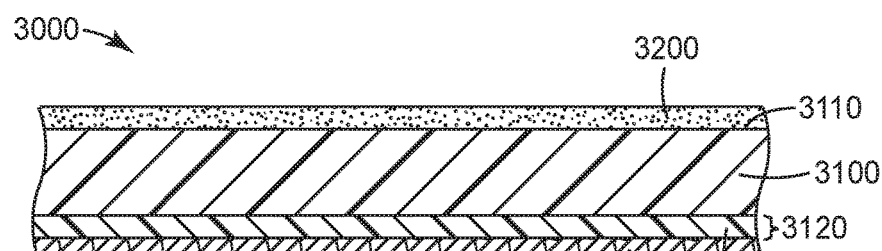
FIG. 3 is a profile view of still another article as described herein.

FIG. 3 shows article 3000, which includes substrate 3100, which can be any substrate, for example those described herein, having first major surface 3110 and second major surface 3120. Second major surface 3120 includes primer layer 3121, which can be any primer layer, for example those described herein. In FIG. 3, there is no primer layer on first major surface 3110.

Pressure sensitive adhesive 3200 is disposed on first major surface 3110. Pressure sensitive adhesive 3200 can be any pressure sensitive adhesive, such as those described herein.

Release layer 3300 is disposed on second major surface 3120 so as to contact primer layer 3121. Release layer 3300 can be any release layer, such as those described herein, and can contain any silicone carbonate polymer, such as any of those described herein.

Figure 4:
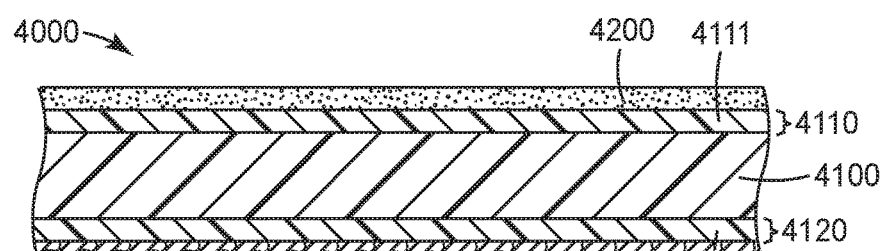
FIG. 4 is a profile view of yet another article as described herein.

FIG. 4 shows article 4000, which includes substrate 4100, which can be any substrate, for example those described herein, having first major surface 4110 and second major surface 4120. First major surface 4110 includes first primer layer 4111, and second major surface 4120 includes second primer layer 4121.

Pressure sensitive adhesive 4200 is disposed on first major surface 4110 so as to contact first primer layer 4111. Pressure sensitive adhesive 4200 can be any pressure sensitive adhesive, such as those described herein.

Release layer 4300 is disposed on second major surface 4120 so as to contact second primer layer 4121. Release layer 4300 can be any release layer, such as those described herein, and can contain any silicone carbonate polymer, such as any of those described herein.

Figure 5:
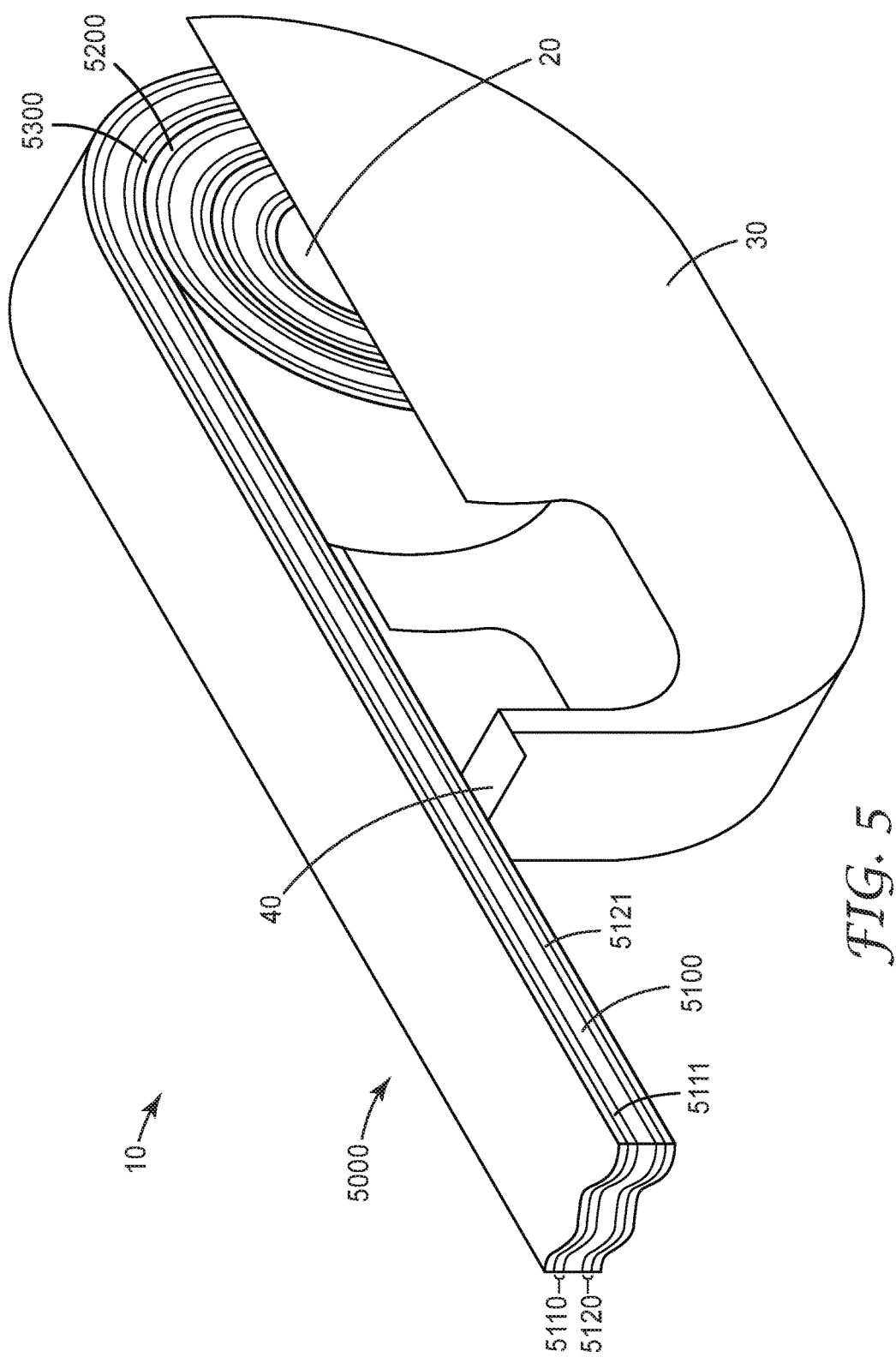
FIG. 5 is a view of an article as described herein in the form of a wound tape with a roller and cutting element.

FIG. 5 depicts an article 10 comprising tape 5000. Tape 5000 comprises substrate 5100, which can be any substrate, for example those described herein, having first major surface 5110 and second major surface 5120. First major surface 5110 includes first primer layer 5111, which can be any primer layer such as those discussed herein. Second major surface 5120 includes second primer layer 5121, which can be any primer layer such as those discussed herein.

Pressure sensitive adhesive 5200 is disposed on first major surface 5110 so as to contact first primer layer 5111. Pressure sensitive adhesive 5200 can be any pressure sensitive adhesive, such as those described herein.

Release layer 5300 is disposed on second major surface 5210 so as to contact second primer layer 5211. Release layer 5300 can be any release layer, such as those described herein, and can contain any silicone carbonate polymer, such as any of those described herein.

The article 10 also includes roller 20 and dispenser 30. Tape 5000 is wound around roller 20 such that pressure sensitive adhesive 5200 releasably contacts release layer 5300. In this configuration, a user can easily unwind and use tape 5000. Article 10 also includes cutting element 40 to facilitate cutting tape 5000 into desired lengths. In FIG. 5, cutting element 40 is attached to roller 20, but this is not required since other configurations of these elements are known to people of ordinary skill in the tape art.

List of Illustrative Embodiments

The following embodiments are enumerated in order to assist a person of skill in the art in understanding various aspects of the disclosure. Because these enumerated embodiments are for illustrative purposes, they are not intended to be limiting.

1. An article comprising
    a substrate having at least a first major surface and a second major surface;
    a pressure sensitive adhesive disposed on the first major surface; and
    a release layer comprising a silicone carbonate polymer disposed on the second major surface.
2. The article of embodiment 1, wherein the substrate is a tape backing.
3. The article of any one of the preceding embodiments, wherein the substrate comprises at least one cellulosic material.
4. The article of embodiment 3, wherein the at least one cellulosic material comprises at least one of cellulose, paper, regenerated cellulose, wood fibers, and wood flour.
5. The article of any of embodiments 1 or 2, wherein the substrate comprises at least one non-cellulosic material.
6. The article of embodiment 5, wherein the non-cellulosic material comprises at least one of cellulose acetate and cellulose acetate phthalate.
7. The article of embodiment 5, wherein the non-cellulosic material comprises at least one polyolefin.
8. The article of embodiment 7, wherein the at least one polyolefin comprises polyethylene, polypropylene, or a combination thereof.
9. The article of embodiment 8, wherein the at least one polyolefin comprises polyethylene.
10. The article of embodiment 5, wherein the non-cellulosic material comprises at least one polyimide.
11. The article of embodiment 5, wherein the non-cellulosic material comprises at least one of poly methyl methacrylate, ethylene vinyl acetate copolymer, acrylate-modified ethylene vinyl acetate copolymer, ethyl acrylic acid copolymer, nylon, polyvinylchloride, polyethylene terephthalate, polyketones, and polymethylpentanes.
12. The article of embodiment 11, wherein the non-cellulosic material comprises at least one of polymethyl methacrylate, ethylene vinyl acetate copolymer, acrylate-modified ethylene vinyl acetate copolymer, ethyl acrylic acid copolymer, polyethylene terephthalate and nylon.
13. The article of embodiment 12, wherein the non-cellulosic material comprises polyethylene terephthalate.
14. The article of any of the preceding embodiments wherein the pressure sensitive adhesive comprises at least one of (meth)acrylic polymers, natural rubbers, synthetic rubbers, and silicone elastomers.
15. The article of embodiment 14, wherein the pressure sensitive adhesive comprises a (meth)acrylic polymer.
16. The article of embodiment 15, wherein the (meth)acrylic polymer comprises a polymerized form of at least one of methyl methacrylate, ethyl methacrylate, n-butyl methacrylate, methyl acrylate, ethyl acrylate, n-butyl acrylate, iso-octyl acrylate, iso-nonyl acrylate, 2-ethyl-hexyl acrylate, decyl acrylate, dodecyl acrylate, n-butyl acrylate, hexyl acrylate, octadecyl acrylate, octadecyl methacrylate, acrylic acid, methacrylic acid, and acrylonitrile.
17. The article of embodiment 14, wherein the pressure sensitive adhesive comprises at least one of polyvinyl ethers, polyisoprenes, butyl rubbers, polyisobutylenes, polychloroprenes, butadiene-acrylonitrile polymer, styrene-isoprene, styrene-butylene, and styrene-isoprene-styrene block copolymer, ethylene-propylene-diene polymers styrene-butadiene polymer, styrene polymer, poly-alpha-olefin, amorphous polyolefin, polysiloxane, ethylene vinyl acetate, polyurethane, silicone-urea polymer, silicone-urethane polymer, and polyvinylpyrrolidone.
18. The article of any of the preceding embodiments, wherein the pressure sensitive adhesive further comprises a tackifier.
19. The article of embodiment 18, wherein the tackifier comprises at least one of rosin, synthetic hydrocarbon resin, terpene resin, and liquid rubber.
20. The article of any of embodiments 18-19, wherein the tackifier is present from 0.1 wt. % to 95 wt. % based on the weight of the pressure sensitive adhesive.
21. The article of embodiment 20, wherein the tackifier is present from 1 wt. % to 95 wt. % based on the weight of the pressure sensitive adhesive
22. The article of embodiment 21, wherein the tackifier is present from 20 wt. % to 95 wt. % based on the weight of the pressure sensitive adhesive.
23. The article of embodiment 22, wherein the tackifier is present from 50 wt. % to 95 wt. % based on the weight of the pressure sensitive adhesive.

24. The article of embodiment 23, wherein the tackifier is present from 80 wt. % to 95 wt. % based on the weight of the pressure sensitive adhesive.
25. The article of any of the preceding embodiments, wherein the silicone carbonate copolymer comprises at least one silicone portion having the structure of Formula (I)

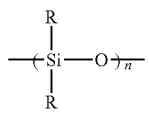
(I)

wherein each R is independently an organic moiety and n is the degree of polymerization of the silicone portion which is no less than 1.
26. The article of embodiment 25, wherein at least one R is alkyl.
27. The article of any of embodiments 25 and 26, wherein each R is independently alkyl.
28. The article of any of embodiments 26 and 27, wherein the alkyl is $C_1$ to $C_{22}$ alkyl.
29. The article of embodiment 28, wherein the alkyl is $C_1$ to $C_{16}$ alkyl.
30. The article of embodiment 29, wherein the alkyl is $C_1$ to $C_8$ alkyl.
31. The article of embodiment 30, wherein the alkyl is $C_1$ to $C_4$ alkyl.
32. The article of embodiment 31, wherein the alkyl is methyl.
33. The article of embodiment 25, wherein the at least one silicone portion is polydimethylsiloxane.
34. The article of any of the preceding embodiments, wherein the silicone carbonate polymer comprises at least one carbonate portion having the structure of Formula (II)

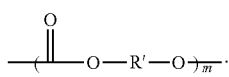
(II)

wherein each R' is independently a hydrocarbon diradical or an aromatic diradical, and m is the degree of polymerization of the carbonate portion which is no less than 1.
35. The article of embodiment 34, wherein at least one aromatic hydrocarbon diradical comprises one or more phenyl radicals, one or more phenylene diradicals, or one or more phenyl radicals and one or more phenylene diradicals.
36. The article of embodiment 34 or 35, wherein each R' is independently selected from the group consisting of

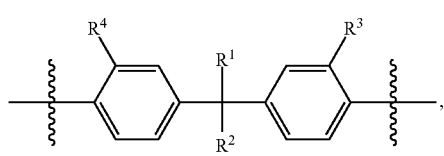
(III)

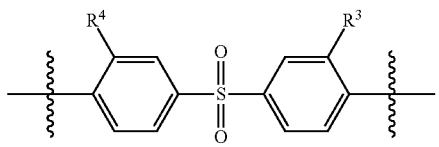
(IV)

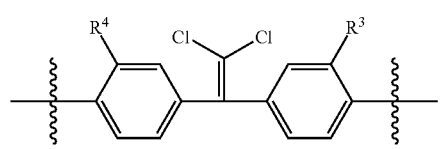
(V)

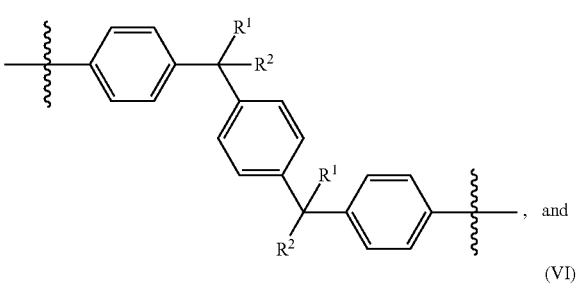
(VI), and

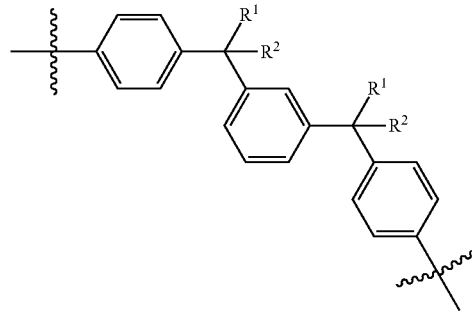
(VI)

wherein either:
R1 is H, C1 to C4 alkyl, C1 to C4 fluoroalkyl, C1 to C4 perfluoroalkyl, or phenyl, and
R2 is HH, C1 to C4 alkyl, C1 to C4 fluoroalkyl, C1 to C4 perfluoroalkyl, or phenyl; or
R1 and R2 are covalently bonded to one another to make, together with the carbon atom to which they are attached, cyclohexyl, methyl cyclohexyl, dimethyl cyclohexyl, or trimethyl cyclohexyl or tetramethyl cyclohexyl;
R3 is C1 to C4 alkyl, phenyl, or H; and
R4 is C1 to C4 alkyl, phenyl, or H.
37. The article of embodiment 36, wherein each R' is independently selected from the group consisting of

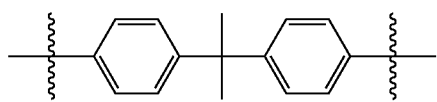
(VII)

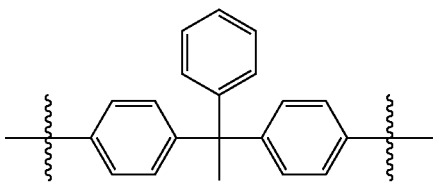
(VIII)

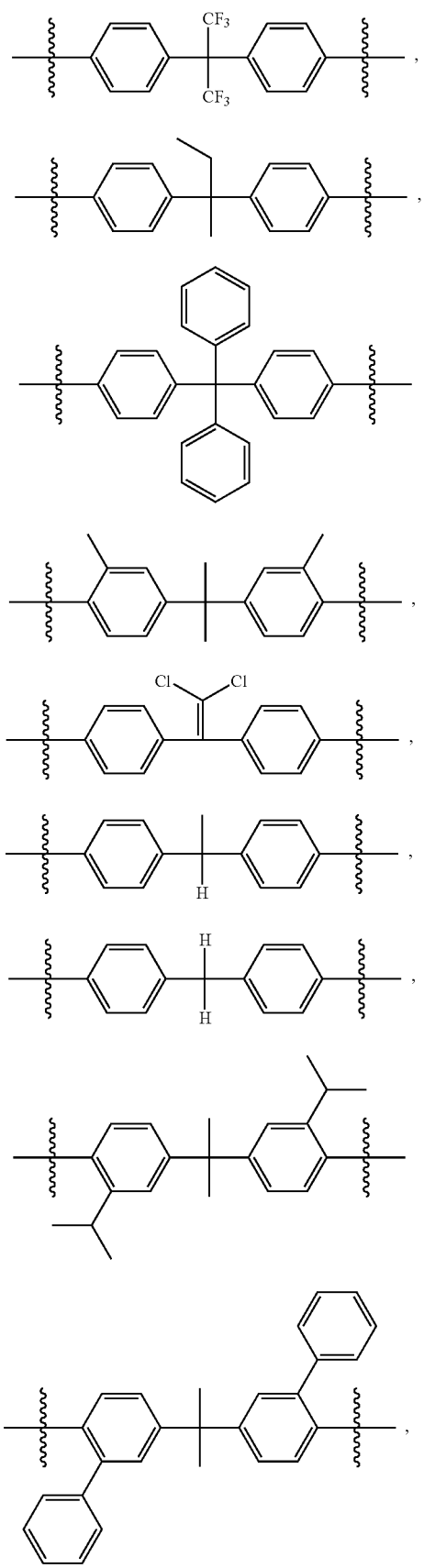

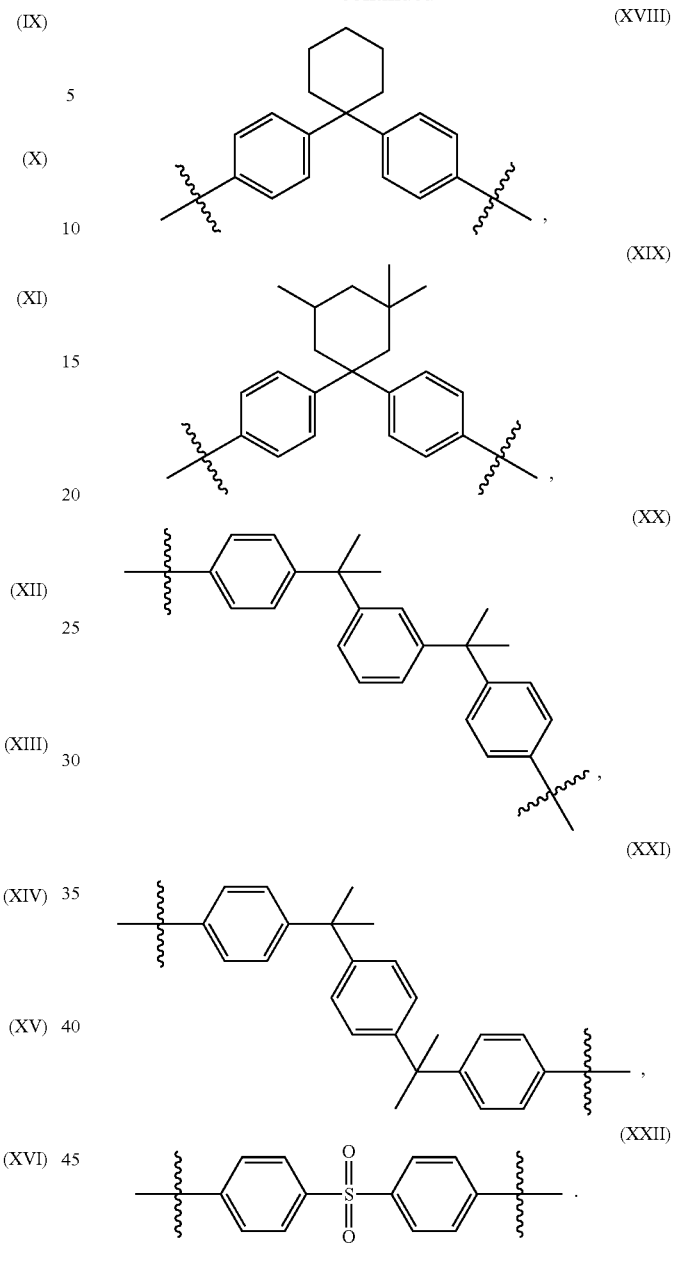

38. The article of embodiment 37, wherein each R' is a diradical of Formula (VII)

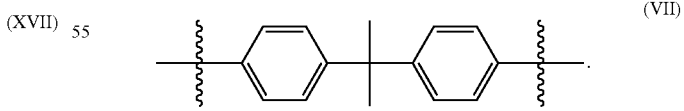

39. The article of any of the preceding embodiments, wherein the silicone carbonate polymer contains 0.5 wt. % to 60 wt. % silicone based on the weight of the silicone carbonate polymer.

40. The article of any of the preceding embodiments, wherein the silicone carbonate polymer contains no less than 5 wt. % silicone based on the weight of the silicone carbonate polymer.

41. The article of any of the preceding embodiments, wherein the silicone carbonate polymer contains no less than 10 wt. % silicone based on the weight of the silicone carbonate polymer.
42. The article of any of the preceding embodiments, wherein the silicone carbonate polymer contains no more than 50 wt. % silicone based on the weight of the silicone carbonate polymer.
43. The article of any of the preceding embodiments, wherein the silicone carbonate polymer has a number average molecular weight from 10,000 D to 250,000 D.
44. The article of embodiment 43, wherein the silicone carbonate polymer has a number average molecular weight from 20,000 D to 175,000 D.
45. The article of embodiment 44, wherein the silicone carbonate polymer has a number average molecular weight from 40,000 D to 150,000 D.
46. The article of any of the preceding embodiments, wherein the release layer comprises no less than 1 wt. % of the silicone carbonate polymer based on the total weight of release layer.
47. The article of embodiment 46, wherein the release layer comprises no less than 2.5 wt. % of the silicone carbonate polymer based on the total weight of release layer.
48. The article of embodiment 46, wherein the release layer comprises no less than 5 wt. % of the silicone carbonate polymer based on the total weight of release layer.
49. The article of embodiment 46, wherein the release layer comprises no less than 7.5 wt. % of the silicone carbonate polymer based on the total weight of release layer.
50. The article of embodiment 46, wherein the release layer comprises no less than 10 wt. % of the silicone carbonate polymer based on the total weight of release layer.
51. The article of embodiment 46, wherein the release layer comprises no less than 12.5 wt. % of the silicone carbonate polymer based on the total weight of release layer.
52. The article of embodiment 46, wherein the release layer comprises no less than 15 wt. % of the silicone carbonate polymer based on the total weight of release layer.
53. The article of embodiment 46, wherein the release layer comprises no less than 17.5 wt. % of the silicone carbonate polymer based on the total weight of release layer.
54. The article of embodiment 46, wherein the release layer comprises no less than 20 wt. % of the silicone carbonate polymer based on the total weight of release layer.
55. The article of embodiment 46, wherein the release layer comprises no less than 22.5 wt. % of the silicone carbonate polymer based on the total weight of release layer.
56. The article of embodiment 46, wherein the release layer comprises no less than 25 wt. % of the silicone carbonate polymer based on the total weight of release layer.
57. The article of embodiment 46, wherein the release layer comprises no less than 27.5 wt. % of the silicone carbonate polymer based on the total weight of release layer.
58. The article of embodiment 46, wherein the release layer comprises no less than 30 wt. % of the silicone carbonate polymer based on the total weight of release layer.
59. The article of embodiment 46, wherein the release layer comprises no less than 32.5 wt. % of the silicone carbonate polymer based on the total weight of release layer.
60. The article of embodiment 46, wherein the release layer comprises no less than 35 wt. % of the silicone carbonate polymer based on the total weight of release layer.
61. The article of embodiment 46, wherein the release layer comprises no less than 37.5 wt. % of the silicone carbonate polymer based on the total weight of release layer.
62. The article of embodiment 46, wherein the release layer comprises no less than 40 wt. % of the silicone carbonate polymer based on the total weight of release layer.
63. The article of embodiment 46, wherein the release layer comprises no less than 42.5 wt. % of the silicone carbonate polymer based on the total weight of release layer.
64. The article of embodiment 46, wherein the release layer comprises no less than 45 wt. % of the silicone carbonate polymer based on the total weight of release layer.
65. The article of embodiment 46, wherein the release layer comprises no less than 47.5 wt. % of the silicone carbonate polymer based on the total weight of release layer.
66. The article of embodiment 46, wherein the release layer comprises no less than 50 wt. % of the silicone carbonate polymer based on the total weight of release layer.
67. The article of embodiment 46, wherein the release layer comprises no less than 52.5 wt. % of the silicone carbonate polymer based on the total weight of release layer.
68. The article of embodiment 46, wherein the release layer comprises no less than 55 wt. % of the silicone carbonate polymer based on the total weight of release layer.
69. The article of embodiment 46, wherein the release layer comprises no less than 57.5 wt. % of the silicone carbonate polymer based on the total weight of release layer.
70. The article of embodiment 46, wherein the release layer comprises no less than 60 wt. % of the silicone carbonate polymer based on the total weight of release layer.
71. The article of embodiment 46, wherein the release layer comprises no less than 62.5 wt. % of the silicone carbonate polymer based on the total weight of release layer.
72. The article of embodiment 46, wherein the release layer comprises no less than 65 wt. % of the silicone carbonate polymer based on the total weight of release layer.
73. The article of embodiment 46, wherein the release layer comprises no less than 67.5 wt. % of the silicone carbonate polymer based on the total weight of release layer.
74. The article of embodiment 46, wherein the release layer comprises no less than 70 wt. % of the silicone carbonate polymer based on the total weight of release layer.
75. The article of embodiment 46, wherein the release layer comprises no less than 72.5 wt. % of the silicone carbonate polymer based on the total weight of release layer.
76. The article of embodiment 46, wherein the release layer comprises no less than 75 wt. % of the silicone carbonate polymer based on the total weight of release layer.
77. The article of embodiment 46, wherein the release layer comprises no less than 77.5 wt. % of the silicone carbonate polymer based on the total weight of release layer.
78. The article of embodiment 46, wherein the release layer comprises no less than 80 wt. % of the silicone carbonate polymer based on the total weight of release layer.
79. The article of embodiment 46, wherein the release layer comprises no less than 82.5 wt. % of the silicone carbonate polymer based on the total weight of release layer.
80. The article of embodiment 46, wherein the release layer comprises no less than 85 wt. % of the silicone carbonate polymer based on the total weight of release layer.
81. The article of embodiment 46, wherein the release layer comprises no less than 87.5 wt. % of the silicone carbonate polymer based on the total weight of release layer.
82. The article of embodiment 46, wherein the release layer comprises no less than 90 wt. % of the silicone carbonate polymer based on the total weight of release layer.
83. The article of embodiment 46, wherein the release layer comprises no less than 92.5 wt. % of the silicone carbonate polymer based on the total weight of release layer.

84. The article of embodiment 46, wherein the release layer comprises no less than 95 wt. % of the silicone carbonate polymer based on the total weight of release layer.

85. The article of embodiment 46, wherein the release layer comprises no less than 97.5 wt. % of the silicone carbonate polymer based on the total weight of release layer.

86. The article of embodiment 46, wherein the release layer comprises no less than 99 wt. % of the silicone carbonate polymer based on the total weight of release layer.

87. The article of any of the preceding embodiments, wherein the release layer consists essentially of the silicone carbonate polymer.

88. The article any of the preceding embodiments, wherein the release layer comprises no greater than 2.5 wt. % of the silicone carbonate polymer based on the total weight of release layer.

89. The article of any of embodiments 1 to 87, wherein the release layer comprises no greater than 5 wt. % of the silicone carbonate polymer based on the total weight of release layer.

90. The article of any of embodiments 1 to 87, wherein the release layer comprises no greater than 7.5 wt. % of the silicone carbonate polymer based on the total weight of release layer.

91. The article of any of embodiments 1 to 87, wherein the release layer comprises no greater than 10 wt. % of the silicone carbonate polymer based on the total weight of release layer.

92. The article of any of embodiments 1 to 87, wherein the release layer comprises no greater than 12.5 wt. % of the silicone carbonate polymer based on the total weight of release layer.

93. The article of any of embodiments 1 to 87, wherein the release layer comprises no greater than 15 wt. % of the silicone carbonate polymer based on the total weight of release layer.

94. The article of any of embodiments 1 to 87, wherein the release layer comprises no greater than 17.5 wt. % of the silicone carbonate polymer based on the total weight of release layer.

95. The article of any of embodiments 1 to 87, wherein the release layer comprises no greater than 20 wt. % of the silicone carbonate polymer based on the total weight of release layer.

96. The article of any of embodiments 1 to 87, wherein the release layer comprises no greater than 22.5 wt. % of the silicone carbonate polymer based on the total weight of release layer.

97. The article of any of embodiments 1 to 87, wherein the release layer comprises no greater than 25 wt. % of the silicone carbonate polymer based on the total weight of release layer.

98. The article of any of embodiments 1 to 87, wherein the release layer comprises no greater than 27.5 wt. % of the silicone carbonate polymer based on the total weight of release layer.

99. The article of any of embodiments 1 to 87, wherein the release layer comprises no greater than 30 wt. % of the silicone carbonate polymer based on the total weight of release layer.

100. The article of any of embodiments 1 to 87, wherein the release layer comprises no greater than 32.5 wt. % of the silicone carbonate polymer based on the total weight of release layer.

101. The article of any of embodiments 1 to 87, wherein the release layer comprises no greater than 35 wt. % of the silicone carbonate polymer based on the total weight of release layer.

102. The article of any of embodiments 1 to 87, wherein the release layer comprises no greater than 37.5 wt. % of the silicone carbonate polymer based on the total weight of release layer.

103. The article of any of embodiments 1 to 87, wherein the release layer comprises no greater than 40 wt. % of the silicone carbonate polymer based on the total weight of release layer.

104. The article of any of embodiments 1 to 87, wherein the release layer comprises no greater than 42.5 wt. % of the silicone carbonate polymer based on the total weight of release layer.

105. The article of any of embodiments 1 to 87, wherein the release layer comprises no greater than 45 wt. % of the silicone carbonate polymer based on the total weight of release layer.

106. The article of any of embodiments 1 to 87, wherein the release layer comprises no greater than 47.5 wt. % of the silicone carbonate polymer based on the total weight of release layer.

107. The article of any of embodiments 1 to 87, wherein the release layer comprises no greater than 50 wt. % of the silicone carbonate polymer based on the total weight of release layer.

108. The article of any of embodiments 1 to 87, wherein the release layer comprises no greater than 52.5 wt. % of the silicone carbonate polymer based on the total weight of release layer.

109. The article of any of embodiments 1 to 87, wherein the release layer comprises no greater than 55 wt. % of the silicone carbonate polymer based on the total weight of release layer.

110. The article of any of embodiments 1 to 87, wherein the release layer comprises no greater than 57.5 wt. % of the silicone carbonate polymer based on the total weight of release layer.

111. The article of any of embodiments 1 to 87, wherein the release layer comprises no greater than 60 wt. % of the silicone carbonate polymer based on the total weight of release layer.

112. The article of any of embodiments 1 to 87, wherein the release layer comprises no greater than 62.5 wt. % of the silicone carbonate polymer based on the total weight of release layer.

113. The article of any of embodiments 1 to 87, wherein the release layer comprises no greater than 65 wt. % of the silicone carbonate polymer based on the total weight of release layer.

114. The article of any of embodiments 1 to 87, wherein the release layer comprises no greater than 67.5 wt. % of the silicone carbonate polymer based on the total weight of release layer.

115. The article of any of embodiments 1 to 87, wherein the release layer comprises no greater than 70 wt. % of the silicone carbonate polymer based on the total weight of release layer.

116. The article of any of embodiments 1 to 87, wherein the release layer comprises no greater than 72.5 wt. % of the silicone carbonate polymer based on the total weight of release layer.

117. The article of any of embodiments 1 to 87, wherein the release layer comprises no greater than 75 wt. % of the silicone carbonate polymer based on the total weight of release layer.
118. The article of any of embodiments 1 to 87, wherein the release layer comprises no greater than 77.5 wt. % of the silicone carbonate polymer based on the total weight of release layer.
119. The article of any of embodiments 1 to 87, wherein the release layer comprises no greater than 80 wt. % of the silicone carbonate polymer based on the total weight of release layer.
120. The article of any of embodiments 1 to 87, wherein the release layer comprises no greater than 82.5 wt. % of the silicone carbonate polymer based on the total weight of release layer.
121. The article of any of embodiments 1 to 87, wherein the release layer comprises no greater than 85 wt. % of the silicone carbonate polymer based on the total weight of release layer.
122. The article of any of embodiments 1 to 87, wherein the release layer comprises no greater than 87.5 wt. % of the silicone carbonate polymer based on the total weight of release layer.
123. The article of any of embodiments 1 to 87, wherein the release layer comprises no greater than 90 wt. % of the silicone carbonate polymer based on the total weight of release layer.
124. The article of any of embodiments 1 to 87, wherein the release layer comprises no greater than 92.5 wt. % of the silicone carbonate polymer based on the total weight of release layer.
125. The article of any of embodiments 1 to 87, wherein the release layer comprises no greater than 95 wt. % of the silicone carbonate polymer based on the total weight of release layer.
126. The article of any of embodiments 1 to 87, wherein the release layer comprises no greater than 97.5 wt. % of the silicone carbonate polymer based on the total weight of release layer.
127. The article any of embodiments 1 to 87, wherein the release layer comprises no greater than 99 wt. % of the silicone carbonate polymer based on the total weight of release layer.
128. The article of any of the preceding embodiments, wherein the second major surface comprises a primer layer.
129. The article of embodiment 128, wherein the primer layer comprises at least one of chlorinated polyolefin, polyamide, and modified acrylic polymer.
130. The article of any of the preceding embodiment, wherein the article comprises a tape.
131. The article of embodiment 130, wherein the tape is hand-tearable.
132. The article of any of embodiments 130 to 131, wherein the tape is wound.
133. The article of any of the preceding embodiments, further comprising a roller.
134. The article of any of the preceding embodiments, wherein the article comprises a tape that is wound around a roller.
135. The article of any of the preceding embodiments, further comprising a cutting element.
136. The article of any of claims 130-135, wherein the article comprises a tape dispenser.
137. The article of any of the preceding embodiments, wherein the pressure sensitive adhesive is a repositionable adhesive.
138. The article of embodiment 137, wherein the article is a repositionable article.

Examples

The invention is further illustrated by the following examples. These examples are for illustrative purposes only and are not meant to be limiting on the scope of the appended claims.

TABLE 1

| | Materials | |
|---|---|---|
| Designation | Description | Source |
| LEXAN EXL 1414T | A polycarbonate polydimethylsiloxane copolymer available from SABIC under the trade designation "LEXAN EXL 1414T" | SABIC, Riyadh, Saudi Arabia |
| NMP | N-methylpyrrolidone | TCI America, Portland, OR |
| Primed PET Film | A primed PET ("poly(ethylene terephthalate)") film available from Mitsubishi under the trade designation "HOSTAPHAN 0.002 3SAB PRIMED 1S 50 IN" | Mitsubishi Polyester Film, Inc., Greer SC |
| 373 TAPE | A packaging tape, available from 3M Co. under the trade designation "SCOTCH HIGH PERFORMANCE BOX SEALING TAPE 373" | 3M Co., St. Paul, MN |
| 2097 TAPE | A painter's tape, available from 3M Co. under the trade designation "SCOTCHBLUE PAINTER'S TAPE EXTERIOR SURFACES 2097" | 3M Co., St. Paul, MN |
| 850 TAPE | A polyester film tape, available from 3M Co. under the trade designation "3M 850 CLEAR POLYESTER FILM TAPE" | 3M Co., St. Paul, MN |

Preparation of LAB-Coated PET Film

A sample of silicone polycarbonate (LEXAN EXL 1414T) was weighed out and dissolved in NMP to obtain a 2.5 wt. % solids solution. The 2.5 wt. % solution was then coated onto a primed PET film using a #6 Meyer rod. The coated PET film was placed onto an open frame particle board, coated side up, and dried in an oven at 110° C. for 15 minutes to give an LAB-coated PET film.

Preparation of Example Laminated Tape Sample for Peel Force and Re-Adhesion Force Testing After drying the LAB-coated PET film, various samples of tape (used as received) were unwound from their rolls and cut to 1 inch (~2.5 cm) wide and 6 inches (~15.2 cm) long. The cut tape samples were then laminated onto the LAB-coated PET film. A 5 lb. (~2.3 kg) roller was rolled back and forth across the laminated tape once. For aging, the laminated samples were kept between two glass plates, in layers separated with a sheet of silicone liner. The laminated samples were aged at various time, temperature, and relative humidity conditions, as indicated in Tables 3-6.

Preparation of Control Laminated Tape Samples (CE-1 to CE-3) for "Tape-on-Tape" Measurements As a control, tape-on-tape control samples of the "as received" tapes were prepared as follows. A first piece of the "as received" tape being tested was laminated onto PET film (but with no LAB coating). Then a second piece of the same "as received" tape, cut to 1 inch (~2.5 cm) wide and 6 inches (~15.2 cm) long, was laminated on top of the first piece of tape. A 5 lb. (~2.3 kg) roller was rolled back and forth across the laminated tape once. For aging, the laminated samples were kept between two glass plates, in layers separated with a sheet of silicone liner. The laminated samples were aged at various time, temperature, and relative humidity conditions, as indicated in Tables 3-6.

Test Methods

All peel tests were conducted in a constant temperature and controlled percent relative humidity (% RH) room ("CTCH room"). The room was set for 72° F. (~22° C.) and 50% RH. The summarized test results are the average of triplicate samples.

180° Peel Test Method—for Examples

A piece of double sided tape was adhered to a glass plate on a peel tester (SLIP/PEEL TESTER MODEL 3M90, available from Instrumentors Inc., Strongsville, Ohio). Then the aged tape sample (either an Example laminated tape sample or a Control laminated tape sample) was laminated onto the double sided piece of tape. The aged tape sample was rolled with a 5 lb. (~2.3 kg) roller in a forward direction one time. The tape was then peeled at an angle of 180° with a peel rate of 90 in/min (~2.3 m/min) to yield a peel force value, and the resulting peel force value was converted to N/dm.

Re-Adhesion Force Test Method

The tape sample that was peeled in the 180° Peel Test Method was subsequently laminated onto a glass plate on a peel tester (IMASS MODEL TL-2300, available from Instrumentors Inc., Strongsville, Ohio) and rolled in one direction with a 5 lb. (~2.3 kg) roller to provide a "re-adhered" sample. The re-adhered sample was peeled at an angle of 180° with a peel rate of 90 in/min (~2.3 m/min.). The resulting re-adhesion force values were converted to N/dm.

TABLE 2

Tape Samples

| Sample No. | Description |
| --- | --- |
| EX-1 | 373 TAPE + silicone carbonate polymer release layer |
| CE-1 | 373 TAPE (as received) |
| EX-2 | 2097 TAPE + silicone carbonate polymer release layer |
| CE-2 | 2097 TAPE (as received) |
| EX-3 | 850 TAPE + silicone carbonate polymer release layer |
| CE-3 | 850 TAPE (as received) |

Percent adhesion values were determined by dividing the re-adhesion value of the Example laminated tape sample by the re-adhesion value obtained with the respective control laminated tape sample (tape-on-tape sample), and then multiplying by 100.

Test data for peel force, re-adhesion force, and the calculated percent adhesion values were as summarized in each of Tables 3-6, with the aging conditions indicated in the title of each respective Table.

TABLE 3

Aging conditions: 3 days in CTCH room at 72° F. (~22°C.) 50% RH

| Sample No. | Peel Force, oz/in (N/dm) | Re-adhesion Force, oz/in (N/dm) | Percent Adhesion |
| --- | --- | --- | --- |
| EX-1 | 7.3 (8.0) | 67.9 (74.0) | 127 |
| CE-1 | 14.6 (16.0) | 53.6 (58.4) | |
| EX-2 | 7.5 (8.2) | 51.9 (56.6) | 148 |
| CE-2 | 16.6 (18.1) | 35 (38.2) | |
| EX-3 | 3.5 (3.8) | 44.8 (48.8) | 116 |
| CE-3 | 8.7 (9.5) | 38.6 (42.1) | |

TABLE 4

Aging conditions: 3 days at 65° C., dry oven

| Sample No. | Peel Force, oz/in (N/dm) | Re-adhesion Force, oz/in (N/dm) | Percent Adhesion |
| --- | --- | --- | --- |
| EX-1 | 9.8 (10.7) | 70.4 (76.7) | 141 |
| CE-1 | 38.2 (41.6) | 50.1 (54.6) | |
| EX-2 | 10.6 (11.6) | 46.7 (50.9) | 146 |
| CE-2 | 31.1 (33.9) | 32 (34.9) | |
| EX-3 | 11.4 (12.4) | 39.9 (43.5) | 106 |
| CE-3 | 11.8 (12.9) | 37.8 (41.2) | |

TABLE 5

Aging conditions 7 days in CTCH room at 90° F. (~32° C.) and 90% RH

| Sample No. | Peel Force, oz/in (N/dm) | Re-adhesion Force, oz/in (N/dm) | Percent Adhesion |
| --- | --- | --- | --- |
| EX-1 | 6.4 (7.0) | 72.8 (79.4) | 143 |
| CE-1 | 23.1 (25.2) | 50.8 (55.4) | |
| EX-2 | 7.3 (8.0) | 52.2 (56.9) | 132 |
| CE-2 | 25.4 (27.7) | 39.4 (42.9) | |

TABLE 6

Aging conditions: 7 days at 50° C., dry oven

| Sample No. | Peel Force, oz/in (N/dm) | Re-adhesion Force, oz/in (N/dm) | Percent Adhesion |
| --- | --- | --- | --- |
| EX-1 | 8.1 (8.8) | 72.4 (78.9) | 143 |
| CE-1 | 16.6 (18.1) | 50.8 (55.4) | |

TABLE 6-continued

Aging conditions: 7 days at 50° C., dry oven

| Sample No. | Peel Force, oz/in (N/dm) | Re-adhesion Force, oz/in (N/dm) | Percent Adhesion |
|---|---|---|---|
| EX-2 | 11.6 (12.6) | 35.1 (38.3) | 124 |
| CE-2 | 9.2 (10.0) | 28.4 (31.0) | |
| EX-3 | 20.2 (22.0) | 33 (36.0) | 89 |
| CE-3 | 8.2 (8.9) | 36.9 (40.2) | |

What is claimed is:

1. An article comprising
a substrate having a first major surface and a second major surface;
a pressure sensitive adhesive disposed on the first major surface; and
a release layer comprising a silicone carbonate polymer disposed on the second major surface, wherein the silicone carbonate polymer comprises at least one carbonate portion having the structure of Formula (II)

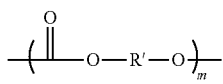
(II)

wherein R' is a hydrocarbon diradical or an aromatic diradical and m is the degree of polymerization of the at least one carbonate portion, which is no less than 100.

2. The article of claim 1, wherein one or more of the first major surface and the second major surface comprises a primer layer.

3. The article of claim 1, wherein the substrate comprises a non-cellulosic material.

4. The article of claim 3, wherein the non-cellulosic material comprises at least one of polymethyl methacrylate, ethylene vinyl acetate copolymer, acrylate-modified ethylene vinyl acetate copolymer, ethyl acrylic acid copolymer, polyethylene terephthalate and nylon.

5. The article of claim 4, wherein the non-cellulosic material comprises one or more of polyethylene, polypropylene, and polyethylene terephthalate.

6. The article of claim 3, wherein the substrate comprises polyimide.

7. The article of claim 1, wherein the silicone carbonate copolymer comprises at least one silicone portion having the structure of Formula (I)

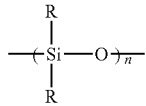
(I)

wherein each R is independently an organic moiety and n is the degree of polymerization of the at least one silicone portion, which is no less than 1.

8. The article of claim 7, wherein the at least one silicone portion comprises polydimethylsiloxane.

9. The article of claim 1, wherein R' is selected from the group consisting of diradicals of Formulas (III) to (VI)

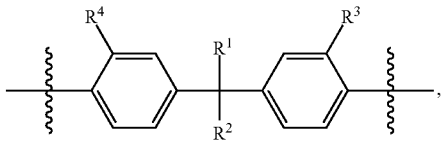
(III)

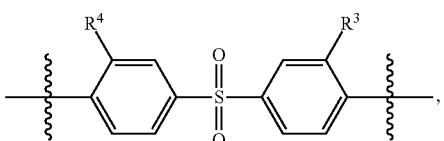
(IV)

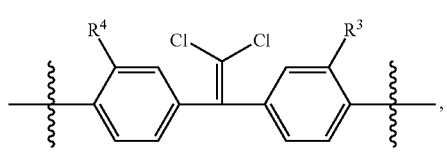
(V)

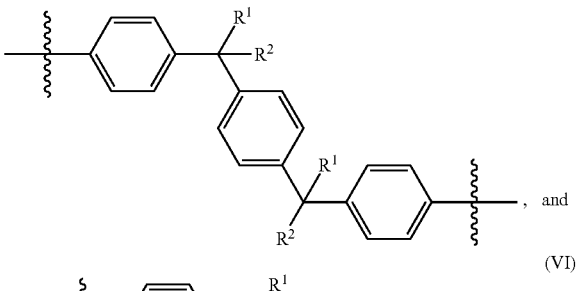
, and
(VI)

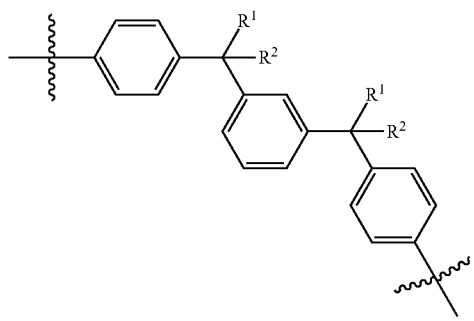
(VI)

wherein either:
R$^{11}$ is H, C$_1$ to C$_4$ alkyl, C$_1$ to C$_4$ fluoroalkyl, C$_1$ to C$_4$ perfluoroalkyl, or phenyl, and
R$^2$ is H H, C$_1$ to C$_4$ alkyl, C$_1$ to C$_4$ fluoroalkyl, C$_1$ to C$_4$ perfluoroalkyl, or phenyl; or
R$^1$ and R$^2$ are covalently bonded to one another to make, together with the carbon atom to which they are attached, cyclohexyl, methyl cyclohexyl, dimethyl cyclohexyl, or trimethyl cyclohexyl or tetramethyl cyclohexyl;
R$^3$ is C$_1$ to C$_4$ alkyl, phenyl, or H; and
R$^4$ is C$_1$ to C$_4$ alkyl, phenyl, or H.

10. The article of claim 9, wherein R' is selected from the group consisting of diradicals of Formulas (VII) to (XXII)

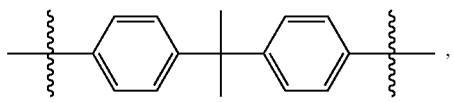
(VII)

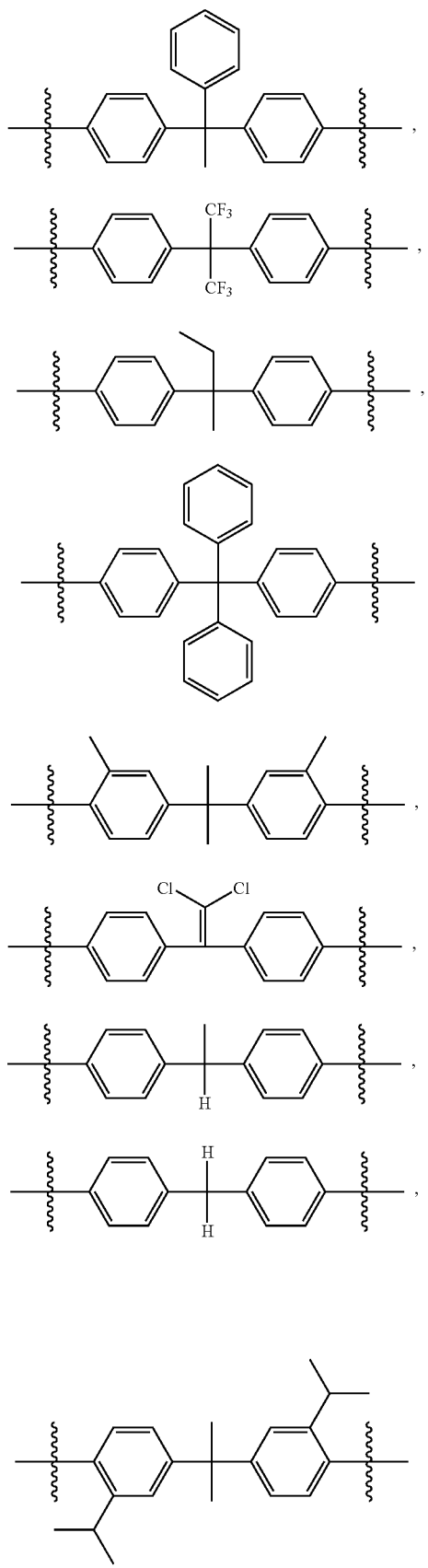
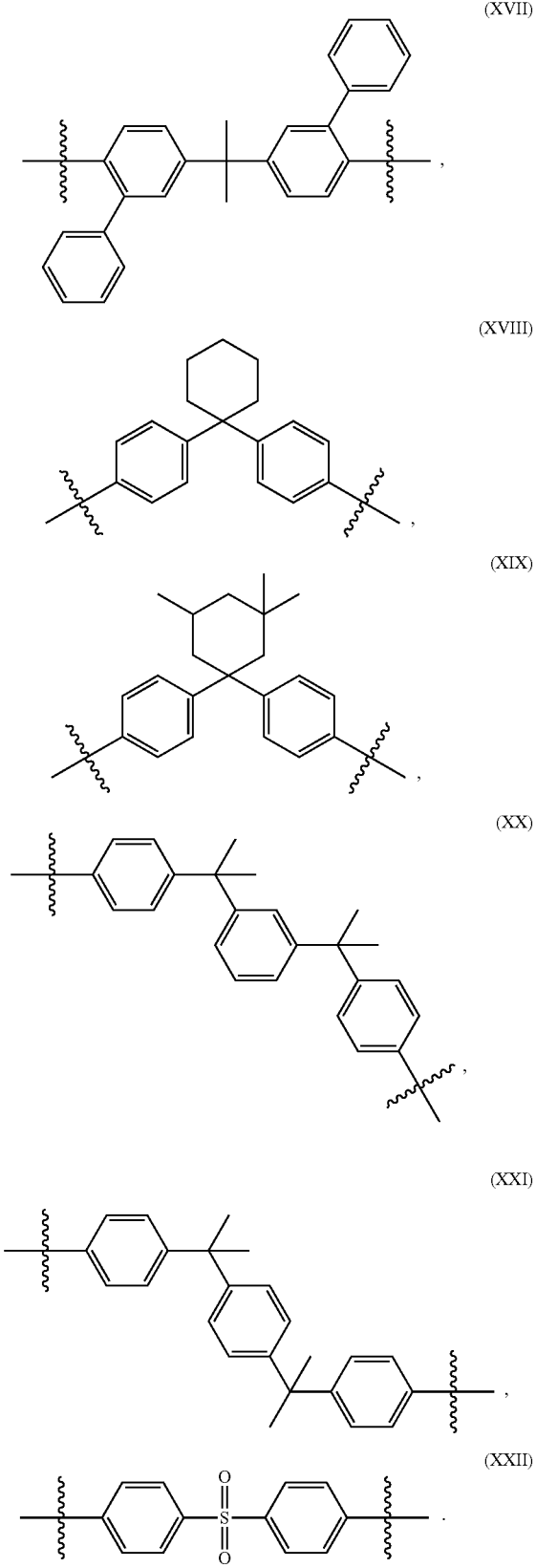
11. The article of claim 10, wherein R' is the diradical of Formula (VII)

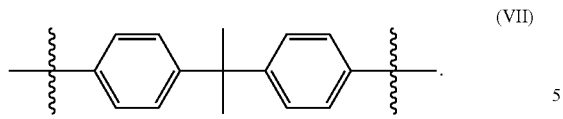

(VII)

12. The article of claim 1, wherein the article is a tape.

13. The article of claim 12, further comprising a roller and wherein the tape is wound around a roller.

14. The article of claim 12, further comprising a cutting element.

15. The article of claim 1, wherein the silicone carbonate polymer contains no less than 5 wt. % silicone based on the weight of the silicone carbonate polymer.

16. The article of claim 1, wherein the silicone carbonate polymer contains no more than 50 wt. % silicone based on the weight of the silicone carbonate polymer.

17. The article of claim 1, wherein the release layer comprises no less than 5 wt. % of the silicone carbonate polymer based on the total weight of release layer.

18. The article of claim 1, wherein the release layer comprises no greater than 77.5 wt. % of the silicone carbonate polymer based on the total weight of release layer.

19. The article of claim 1, wherein the second major surface comprises a primer layer.

20. The article of claim 1 wherein the silicone carbonate polymer has a number average molecular weight of no less than 10,000 Daltons.

\* \* \* \* \*

UNITED STATES PATENT AND TRADEMARK OFFICE
CERTIFICATE OF CORRECTION

PATENT NO. : 10,611,123 B2
APPLICATION NO. : 15/550850
DATED : April 7, 2020
INVENTOR(S) : Phillip Henna et al.

Page 1 of 1

It is certified that error appears in the above-identified patent and that said Letters Patent is hereby corrected as shown below:

In the Specification

Column 1,
Line 38, after "(Phelps)" insert -- , --.

Column 2,
Line 65, after "cellulose" insert -- . --.

Column 4,
Line 42, delete "antioxidents," and insert -- antioxidants, --, therefor.

Column 8,
Line 20, delete "H," and insert -- H H, --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*